United States Patent [19]

Freudenberger et al.

[11] Patent Number: 5,494,993
[45] Date of Patent: Feb. 27, 1996

[54] LOW-PILL, LOW-FLAMMABILITY POLYESTERS, PRODUCTION THEREOF AND STRUCTURES FORMED THEREFROM

[75] Inventors: Volker Freudenberger, Hofheim; Peter Klein, Wiesbaden; Hans-Jerg Kleiner, Kronberg, all of Germany

[73] Assignee: Hoechst Aktiengesellschaft, Frankfurt

[21] Appl. No.: 296,105

[22] Filed: Aug. 25, 1994

[30] Foreign Application Priority Data

Aug. 27, 1993 [DE] Germany ............... 43 28 800.6

[51] Int. Cl.$^6$ ............... C08G 63/68; C08G 79/02
[52] U.S. Cl. ............... 528/287; 528/272; 528/274; 264/176.1; 428/224
[58] Field of Search ............... 528/287, 272, 528/274; 428/224; 264/176.1

[56] References Cited

U.S. PATENT DOCUMENTS

| | | | |
|---|---|---|---|
| 3,335,211 | 8/1967 | Mead et al. ............... | 264/176 |
| 4,127,590 | 11/1978 | Endo et al. . | |
| 4,157,436 | 6/1979 | Endo et al. . | |
| 5,151,494 | 9/1992 | Munday et al. ............... | 528/287 |
| 5,151,494 | 9/1992 | Munday et al. . | |
| 5,180,793 | 1/1993 | Vigneault et al. . | |
| 5,194,572 | 3/1993 | Mossman ............... | 528/287 |
| 5,237,041 | 8/1993 | Kohler et al. ............... | 528/287 |
| 5,300,626 | 4/1994 | Jehl et al. . | |

FOREIGN PATENT DOCUMENTS

| | | |
|---|---|---|
| 0494113A1 | 7/1992 | European Pat. Off. . |
| 1237727 | 3/1967 | Germany . |
| 2646218 | 4/1977 | Germany . |
| 4111066 | 10/1991 | Germany . |

*Primary Examiner*—James J. Seidleck
*Assistant Examiner*—John M. Cooney, Jr.
*Attorney, Agent, or Firm*—Connolly and Hutz

[57] ABSTRACT

Described are low-pill, low-flammability linear fiber-forming polyesters formed from dicarboxylic acid and diol components, which polyesters contain in their polymer chain modifying units formed by esterification or transesterification from compounds of the formulae I and/or II and/or III

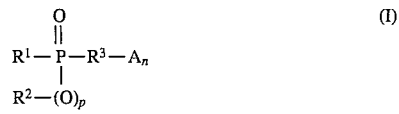

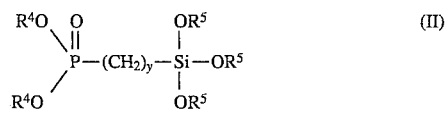

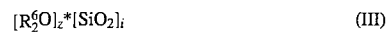

where $R^1$ and $R^2$ are identical or different and each is a univalent aliphatic, araliphatic or aromatic hydrocarbon radical having 1 to 12 carbon atoms, or $R^1$ and $R^2$ are together a bivalent aliphatic, araliphatic or aromatic radical, $R^3$ is an (n+1)-valent organic radical, A is a group capable of ester formation, n is an integer from 1 to 3, $R^4$ and $R^5$ are identical or different and each is hydrogen or a univalent aliphatic, araliphatic or aromatic hydrocarbon radical having 1 to 12 carbon atoms, y is an integer from 1 to 10, $R^6$ is hydrogen or a univalent aliphatic, araliphatic or aromatic hydrocarbon radical having 1 to 12 carbon atoms, and the index z is 0 or an integer from 1 to 2*i and the index i is a sufficiently small integer. Also described are processes for producing these polyesters and their use.

17 Claims, No Drawings

LOW-PILL, LOW-FLAMMABILITY POLYESTERS, PRODUCTION THEREOF AND STRUCTURES FORMED THEREFROM

DESCRIPTION

The present invention relates to modified synthetic linear fiber-forming polyesters having improved fire and pill behavior, processes for producing them and structures formed therefrom, especially low-pill, low-flammability fibers composed of these polyesters. Fibers composed of the customary synthetic linear fiber- and film-forming polyesters, especially those of terephthalic acid, such as polyethylene terephthalate, polybutylene terephthalate and copolyesters thereof, are inherently of sufficiently low flammability for most fields of use. However, in some sectors this inherent fire behavior does not meet the requirements. There has therefore been no shortage of attempts to ameliorate the flammability of polyester fibers, for example by subsequent finishing of the ready-produced textile, by admixture of fire protection components to the polyester melt, or by a chemical modification of the polyester molecule. As regards chemical modification, there have been various proposals, of which ultimately, however, only the modification with phosphorus compounds incorporable in the polyester molecule has become established in industry. Such phosphorus compounds are recited for example in the patent specifications DPS 2 346 787, DPS 2 646 218 and JPS 5 2144-627. Fibers composed of these low-flammability linear polyesters are self-extinguishing and meet the textile fire protection standards of various countries.

However, these fibers have a certain disadvantage, in particular at relatively fine linear densities, in that the pilling behavior of fabrics produced therefrom is not satisfactory. It is known that the pilling of synthetic linear polyesters can be positively influenced by modification with components containing Si—O—C groups. Examples of such modifications are described inter alia in DPS 1 237 727, 1 720 647 or 4 111 066. Such modifier components bring about, on the one hand, a distinct increase in the melt viscosity, compared with a polyester of the same solution viscosity, which increase has an important bearing on the spinning behavior, and, on the other, the possibility of achieving the desired antipilling effect in the ready-produced textile through hydrolytic cleavage of Si—O—C bonds.

If an attempt is made, then, to modify synthetic linear polyesters according to DPS 1 720 647 with diethyl trimethoxysilanephosphonate and according to DPS 2 346 787 with 2-carboxyethylmethylphosphinic acid at one and the same time in order that the simple combination of two components brings about a raw material for a low-pill, low-flammability fiber, this attempt fails, since the Si—O—C bonds necessary for the antipilling effect break even in the course of the drying step preceding the spinning, with simultaneous reduction in the melt viscosity, which is important for the spinning and drawing behavior, and are no longer available for the subsequent antipilling treatment. The result is the same on replacing the diethyl trimethoxysilanephosphonate by a tetraalkyl orthosilicate. Nor has the process described in U.S. Pat. No. 5,180,793, of spinning a raw material mixture by separately polycondensing each of the individual components and then spinning the mixture, found industrial implementation, since, on the one hand, it is more complicated than the production of a single modified polyester and, on the other, it has been found that the modifiers disclosed there further dramatically increase the inherent hydrolysis-sensitivity of the basic components, making a costly further processing step indispensable.

It is therefore an object of the present invention to provide ways and means of producing a low-flammability PET fiber having good pilling properties. This object is achieved by the present invention in that it has now been found, surprisingly, that the production of low-pill, low-flammability fibers is possible if synthetic linear polyesters are conjointly modified with phosphorus compounds of formula (I) and compounds which contain Si—O—C bonds of the formula (II) or (III):

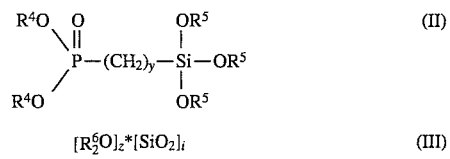

The present invention accordingly provides a low-pill, low-flammability linear fiber-forming polyester formed from dicarboxylic acid and diol components, said polyester containing in its polymer chain modifying units formed by esterification or transesterification from the abovementioned compounds of the formulae I and/or II and/or III.

The proportion of modifier units in the polyester chain is such that the phosphorus content of the polyester is preferably from 0.1 to 2.5, in particular from 0.3 to 1.5,% by weight, and the silicon content preferably from 0.01 to 0.5, in particular from 0.02 to 0.2,% by weight.

In the formula I, $R^1$ and $R^2$ are identical or different and each is a univalent aliphatic, araliphatic or aromatic hydrocarbon radical having 1 to 12 carbon atoms, preferably 1 to 6 carbon atoms.

Furthermore, the radicals $R^1$ and $R^2$ may together form a bivalent aliphatic, araliphatic or aromatic radical. Bivalent aliphatic radicals for $R^1$ and $R^2$ together have 3 to 10, preferably 3 to 6, carbon atoms, and the two bonds directed to the phosphorus or to the oxygen attached to phosphorus are preferably disposed 1,3, 1,4, 1,5 or 1,6. Examples of such aliphatic radicals are 1,3-propanediyl, 1,3- or 1,4-butanediyl, 1,3-, 1,4-, 1,5- or 1,6-hexanediyl.

Bivalent araliphatic or aromatic radicals for $R^1$ and $R^2$ together can have a ring or 2 to 3 mutually fused or non-fused aromatic rings and have a total of 7 to 20 carbon atoms, preferably 7 to 14, especially 7 to 12, carbon atoms.

Examples of such radicals are 1-methylene-2-phenyl, 1,8-naphthalenediyl and preferably 2,2'-biphenyldiyl.

$R^3$ is an (n+1)-valent organic radical, preferably an (n+1)-valent saturated aliphatic hydrocarbon radical having 1 to 12, preferably 1 to 6, in particular 2 to 4, carbon atoms, an araliphatic hydrocarbon radical having 7 to 16, preferably 7 to 14, in particular 8 to 14, carbon atoms or an aromatic hydrocarbon radical having 6 to 16, preferably 6 to 10, carbon atoms. A is a group capable of ester formation, n is an integer from 1 to 3, preferably 2, and p is 0 or 1.

A group capable of ester formation for the purposes of the present invention is preferably a —$COR^7$—group, where $R^7$ is —OH, —Cl, —Br or —$OR^8$ and $R^8$ is preferably an alkyl radical, preferably an unbranched alkyl radical having 1 to 6, in particular 1 to 3, carbon atoms, or a correspondingly long hydroxyalkyl radical.

If n has the preferred value of 2 or is 3, two of the radicals A can also be combined to form a group —CO—O—CO—.

Groups capable of ester formation which are particularly preferred are free carboxyl groups and methoxy- or ethoxy-carbonyl groups.

However, A can also be a hydroxyl group or an acyloxy group, in which case the acyl radical is preferably derived from a lower aliphatic carboxylic acid having a total of 1 to 5, in particular 1 or 2, carbon atoms. Examples of the structural element $-R^3-A_n$ are 2-carboxy-1-ethyl, dicarboxymethyl, 1,1'-dicarboxy-2-ethyl, 1,2-dicarboxy-2-ethyl, 2,3-dicarboxy-1-propyl, 3,5-dicarboxy-1-phenyl and the corresponding lower alkyl esters and anhydrides. OH-functional structural elements capable of ester formation include for example 1,4-dihydroxy-3-butyl and 1,2-di(4-acetyloxyphenyl)-2-ethyl.

In the formula II, $R^4$ and $R^5$ are identical or different and each is hydrogen or, preferably, a univalent aliphatic, araliphatic or aromatic hydrocarbon radical having 1 to 12, preferably 1 to 6, carbon atoms. Again, the two radicals $R^4$ present in the compound of the formula II can be different from each other within the meaning of the above-indicated definition. Preferably, if only for reasons of simpler synthesis, the two radicals $R^4$ are identical. The same applies to the three $R^5$ radicals present in the compound of formula II. Again, these can in principle be different from one another within the above definition, but are preferably identical. y in the formula II is an integer from 1 to 10, preferably from 2 to 4.

In the formula III, $R^6$ is hydrogen or, preferably, a univalent aliphatic, araliphatic or aromatic hydrocarbon radical having 1 to 12, in particular 1 to 6, carbon atoms. Examples of radicals $R^6$ include methyl, ethyl, n-butyl, isobutyl, tert-butyl and octyl. The 2.z radicals $R^6$ present in the compound of formula III can be different from one another within the scope of the above-indicated definition. Preferably, if only for reasons of easier synthesis, the radicals $R^6$ are identical.

The index z in the formula III is an integer from 0 to 2.i.

The index i in the formula III is an integer whose value is essentially determined by the particle size of the colloids of the substance of the formula III. The value of i is set sufficiently small for the particle size of the substance to be below $2.10^{-5}$ mm. Substances of the formula III are generally suitable for modifying the polyesters of the invention when i is within the range from 1 to 20, preferably from 1 to 5.

Examples of known substances of formula III which are suitable for preparing polyesters according to the invention are colloidal silicon dioxide, silicon dioxide organosols, silicic acids of various hydration states ($R^6$ =hydrogen; z=1; i a number from 1 to 5) and their alkyl esters where $R^6$ is then alkyl having 1 to 8, preferably 1 to 4, carbon atoms, e.g. tetraethyl orthosilicate.

A preferred group of compounds of the formula III are those in which the molar ratio z:i ranges from 2:1 to 1:2. Particular preference is given to compounds where z:i=2:1 to 1:1, which also includes the tetraethyl orthosilicate already mentioned.

Aromatic radicals $R^1$ to $R^5$ or present in $R^1$ to $R^5$ may carry up to 4, preferably 0 to 2, further substituents, for example halogens, in particular chlorine or bromine, or alkyl or alkoxy radicals having 1 to 10, preferably 1 to 4, in particular 1 or 2, carbon atoms.

The polyester chains containing the groups formed from the abovementioned modifiers I, II and III otherwise consist of the groups customary in known fiber-forming polyesters.

Predominantly, i.e. to at least 80 mol, they consist of units derived from aromatic dicarboxylic acids and from aliphatic diols. Widely used aromatic dicarboxylic acid units are derived from benzenedicarboxylic acids, in particular from terephthalic acid and isophthalic acid; widely used diols have 2–4 carbon atoms, and ethylene glycol is particularly suitable. Preferably the modified polyesters of the invention contain at least 80 mol % of ethylene terephthalate units. The remaining 20 mol % are then made up of dicarboxylic acid units and/or glycol units which act as modifiers and which make it possible for the person skilled in the art to effect a specific control of the physical and chemical properties of the filaments produced. Such dicarboxylic acid units are derived for example from isophthalic acid or from aliphatic dicarboxylic acids, e.g. glutaric acid, adipic acid or sebacic acid. Examples of modifying diol radicals are those of longer-chain diols, for example of propanediol or butanediol, of di- or triethylene glycol or, if present in a small amount, of polyglycol having a molecular weight of about 500–2000.

Specifically, preference is given to polyesters whose polymer chains contain from 0 to 100 mol % of groups of the formula IV

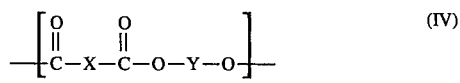

and from 100 to 0 mol % of groups of the formula V

where

X contains more than 80 mol % of aromatic radicals having 5 to 16, preferably 6 to 12, carbon atoms and not more than 20 mol % of aliphatic radicals having 4 to 10 carbon atoms, preferably 6 to 8 carbon atoms, Y contains at least 80 mol % of alkylene or polymethylene groups having 2 to 4 carbon atoms or cycloalkane or dimethylcycloalkane groups having 6 to 10 carbon atoms and not more than 20 mol % of straight-chain or branched alkanediyl having 4 to 16, preferably 4 to 8 carbon atoms, or radicals of the formula $-(C_2H_4-O)_m-C_2H_4-$, where m is an integer from 1 to 40, with m=1 or 2 being preferred for portions up to 20 mol % and groups having m=10 to 40 preferably being present only in portions of below 5 mol %, or radicals of the formula $-(CH_2)_q-Q-(CH_2)_q-$, where Q is O or S (an oxygen or sulfur atom), where q is an integer from 2 to 8, or Q is cycloalkanediyl, or a monocyclic or bicyclic fused or non-fused aromatic radical, in particular phenylene or a radical of the below-indicated formula VI, where q is an integer from 0 to 8.

Bivalent radicals Q with ether groups are those derived from diglycol, triglycol or polyglycol having an average molecular weight from about 500 to 2000.

Examples of cycloaliphatic or aromatic radicals Q are 1,4-cyclohexanediyl, 1,4-dimethylenecyclohexane, 1,3-or 1,4-phenylene, and also the radicals -phenylene- O-phenylene,-phenylene-S-phenylene- or -phenylene-SO$_2$ -phenylene-.

Advantageously, the polyesters of the invention have a relative viscosity from 1.2 to 1.9, preferably 1.4 to 1.8, measured in a 1% strength by weight solution of the polyesters in a mixture of o- and m-cresol in a weight ratio of 10:1 at 25° C.

Preferably, polyesters which contain groups of the formula V contain from 70 to 100 mol %, in particular from 85 to 100 mol %, of groups of the formula IV and from 0 to 30 mol %, in particular from 0 to 15 mol %, of groups of the formula V.

The aromatic radicals X can all be identical within the scope of the definition which has been given, or they can be different.

In particular, the abovementioned groups X, which comprise at least so mol % of the polyester chain, can be present in the polyester chain individually or mixed. The preferred option is for the at least 80 mol % of the polyester chain to be formed of only one or two species of the group of the radicals specified for these main components.

Any desired further modification of the polyester chain is then preferably effected with other groups within the scope of the definition given for the groups X which are present to not more than 20 mol %.

Thus, the at least 80 mol % of aromatic radicals X can all be for example 1,4-phenylene radicals, or they can be composed for example of 2,6-napthalene radicals and 4,4'-biphenyldiyl radicals in a molar ratio of from 4:6 to 6:4.

Preference is given to polyesters in which X comprises at least 95 mol % of aromatic radicals and not more than 5 mol % of aliphatic radicals, but in particular to those in which X is exclusively aromatic radicals.

Similarly, the radicals Y can all be identical within the scope of the definition which has been given, or they can be different.

In particular, the abovementioned groups Y, which comprise at least 80 mol % of the polyester chain, can be present in the polyester chain individually or mixed. The preferred option is for the at least 80 mol % of the polyester chain to be formed of only one or two species of the group of the radicals specified for these main components.

Any desired further modification of the polyester chain is then preferably effected with other groups within the scope of the definition given for the groups Y which are present to not more than 20 mol %.

Thus, the at least 80 mol % of aliphatic radicals Y can all be for example ethylene radicals or they may be made up for example of ethylene and 1,4-dimethylenecyclohexane radicals in a molar ratio from 10:1 to 1:10. Particular preference is given to polyesters in which Y comprises at least 95 mol % of ethylene radicals.

Preferred aromatic radicals X or Q are 1,4- and 1,3-phenylene, 1,4-, 1,5-, 1,8-, 2,6- and 2,7-naphthylene, 4,4'-biphenylene, furylene and radicals of the formula VI

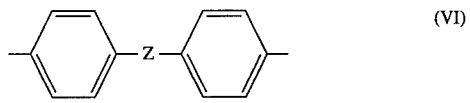

(VI)

where Z is polymethylene or alkylene having 1 to 4 carbon atoms, —SO$_2$—, —COO—, —O— or —S—.

The aromatic radicals X can in turn additionally carry one or two substituents, in which case, however, it is preferable for only a proportion of up to 15%, in particular up to 7%, of the aromatic radicals present to be substituted. Preferably, the substituted aromatic radicals each carry only one substituent. Particularly suitable substituents are alkyl having 1 to 4 carbon atoms, alkoxy having 1 to 4 carbon atoms, chlorine, and sulfo.

Radicals derived from aliphatic dicarboxylic acids and aromatic radicals which yield angled chains, for example isophthalic acid radicals, or which contain bulkier aromatic nuclei, such as the naphthalene nucleus, and also the longer-chain groups Y are incorporated into the polyester chain in particular when a further modification of the properties of the polyester is desired. Preference is given to polyesters which contain less than 7% of these modifying components.

A preferred polyester containing the abovementioned modifiers of the formulae I to III in its chain in the specified amounts is one which contains at least 90 mol % of alkylene terephthalate units of the formula VII

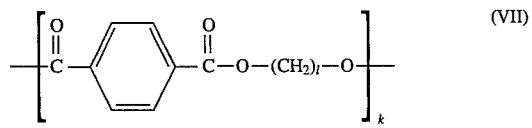

where l is from 2 to 6 and k is above 10, and up to 10 mol % of other units of the abovementioned groups and has been thereby modified so that certain performance characteristics are obtained. An example is polyethylene terephthalate which, through the incorporation of sulfo-containing units (e.g. sulfoisophthalic acid), has an affinity for basic dyes.

The present invention further provides a process for preparing the linear fiber-forming polyesters of the invention.

This process comprises reacting dicarboxylic acids and/or hydroxycarboxylic acids of the formula IVa or Va HOOC—X—COOH; (IVa)

HOOC—X—OH (Va)

where X is as defined above, or their lower (in particular C 1 to C 4) alkyl esters such as terephthalic acid or dimethyl terephthalate with diols of the formula IVb HO—Y—OH (IVb)

where Y is as defined above, e.g. ethylene glycol, in the presence of compounds of the above-indicated compounds of the formulae I and/or III and/or II by esterification or transesterification and then conventionally polycondensing the product.

The compounds I and/or III and/or II are added in such an amount that the phosphorus content of the polyester is preferably from 0.1 to 2.5, in particular from 0.3 to 1.5,% by weight and the silicon content is preferably from 0.01 to 0.5, in particular from 0.02 to 0.2,% by weight.

The process of the invention is carried out using the same reaction conditions as in the production of the corresponding unmodified fiber- and film-forming linear polyesters. Dicarboxylic acid or its lower (in particular C 1 to C 4) alkyl esters such as terephthalic acid or dimethyl terephthalate are reacted with diols such as ethylene glycol by esterification or transesterification and the product is then polycondensed in a conventional manner.

According to the above definitions of X and Y, not only terephthalic acid can be used for preparing the polyesters of the invention, but other dicarboxylic acids and hydroxycarboxylic acids suitable for preparing fiber- and film-forming polyesters; examples are isophthalic acid, 2,6-napthalenedicarboxylic acid, 4,4'-biphenyldicarboxylic acid, 4,4'-sulfonyldiphenyldicarboxylic acid, p-hydroxybenzoic acid. The dicarboxylic acids can be used alone or optionally in mixture with up to 20 mol percent of another aromatic, aliphatic or cycloaliphatic dicarboxylic or hydroxycarboxylic acid, for example those mentioned above, adipic acid or sebacic acid, preference being given to the sole use of terephthalic acid.

Suitable diols other than ethylene glycol include those of the above-defined formula HO(CH$_2$)$_q$—Q—(CH$_2$)$_q$OH, where q and Q are each as defined above. Examples of diols suitable for use in the preparation of the polyesters of the invention are 1,3-propanediol, 1,4-butanediol, 1,4cyclohexanedimethanol, diethylene glycol, dihydroxydiphenyl ether, dihydroxydiphenyl sulfone. The diols can be used alone or combined with one another, but preference is given to the use of at least 80 mol % of ethylene glycol.

The esterification/transesterification and the polycondensation are carried out using customary catalysts, for example manganese acetate, zinc acetate, $Sb_2O_3$, $GeO_2$ or titanic esters.

Of course, the process of the invention may in addition to the commonly used catalysts also include admixtures of all customary additives (for example crosslinking agents, delusterants, stabilizers, dyes, fillers, etc.).

In the esterification/transesterification process, the addition of the phosphorus compounds can take place before or after the esterification/transesterification stage. In the transesterification process, the addition of the phosphorus compounds in the form of free dicarboxylic acids is preferred after the transesterification stage, since if the corresponding dicarboxylic esters are used a distinct slowdown in the transesterification reaction is observed. The addition of the products containing Si—O—C bonds is in the case of the esterification process advantageously carried out during the expulsion of excess glycol. In the case of the transesterification process, the addition can take place before or after the transesterification.

The invention thus consists in the production of synthetic, linear, low-pill, low-flammability polyester raw materials and their processing into formed structures, in particular into fibers, under customary conditions, the synthetic linear polyester being simultaneously modified with a phosphorus compound of formula (I) and a compound of the formula (II) or (III) which contains Si—O—C bonds. In contradistinction to existing forms of modification, the modification according to the invention surprisingly 10 makes it possible to produce a polyester raw material from which it is possible to spin fiber materials which are low-pill and also low-flammable. This is presumably because, in the choice of the above-defined polyester composition, the Si—O—C bonds remain intact during the processing of the polyester raw material and can be cleaved, in the ready-produced fiber, through a hydrolysis treatment. This gives the synthetic low-flammability polyester fibers of the invention which possess good pilling characteristics.

The invention also relates to formed structures produced from the modified polyesters of the invention by extrusion of melts of the polyesters. Such formed structures are shaped articles, films, but especially fiber materials, in particular those for textile purposes.

Fiber materials in the wider sense also include pulps which are obtained by methods other than extrusion processes, for example by centrifugal processes.

However, preferred fiber materials are those obtained by known spinning processes. These fiber materials can be in the form of continuous filament fibers or staple fibers and exist in all subsequent processing states, for example filament yarns, tow, sliver, staple, staple fiber yarn, and the fibers or filaments can be of high or low orientation, drawn or undrawn and textured or flat.

The fiber linear density for the preferred textile use ranges from 0.5 to 15, preferably from 0.5 to 7, dtex, but for specific purposes, for example for reinforcing or stiffening duties, can also be appreciably above 15 dtex, for example be within the linear density range of thick monofilaments (wires).

As usual, the various degrees of orientation and so the strength and the breaking extension of the fiber materials can be adapted in a conventional manner to the intended use via the spinning speed and the optional subsequent drawing.

The texturing can be carried out as usual, for example by stuffer box crimping, by air texturing in jet nozzles, by false-twisting, or by combined draw-texturing. In yarns and yarn products such as woven or knitted fabrics and also in fiber materials such as nonwovens, the fibers of the invention can be present in pure form or admixed with other known fibers so that the articles still have a significantly improved pilling and fire behavior due to the fiber materials of the invention.

Embodiments of the invention will now be more particularly described nonlimitingly by way of example. Percentages are by weight; mole percentages for the composition of X or of Y are in each case based on the totality of the X radicals=100 mol % or on the totality of the Y radicals=100 mol %.

The characterizing parameters of the polyesters described in the examples and the fibers produced therefrom are determined as follows:

The DSC measurements were carried out with the Mettler calorimeter TA 3000 at heating-up rates of 20°/min.

The relative viscosities were determined on 1% strength by weight solutions in a 10:1 mixture of o- and m-cresol at 25°.

For hydrolysis, the fibers were boiled for 10 hours in demineralized water without the addition of an auxiliary. Thereafter the tenacity and relative viscosity were determined.

The burning test used was the French standard "brûleur electrique" NFP 92-503 with its classification into six classes from M0 (unburnable) to M5 (very easily flammable).

The number of bending test cycles was determined by the method of K. H. Grünewald, Chemiefasern Vol. 12, p. 853 (1962). This reference describes the number of bending test cycles as a measure of the abrasion resistance of a fiber, which is appropriate for assessing low-pill properties.

The numbers of bending test cycles determined by this method are according to DE-A-1 720 647 within the range from 3000 to 3500 for normal polyethylene terephthalate fibers, but distinctly below 1000, for example at about 400, for low-pill fiber.

EXAMPLE 1

In a stirred vessel equipped with a column and a reflux condenser, 1000 g of dimethyl terephthalate (DMT) and 600 ml of ethylene glycol (glycol) are heated with 330 mg of manganese acetate and 2.5 g (0.25%) of tetraethyl orthosilicate (TES) at 150°–220° for about 3 hours until the elimination of methanol has ended. Thereafter 47 g (4.7%) of dimethylphosphinylmethylsuccinic acid are esterified in at 220°–230° over about 30 minutes until water elimination is complete. After 120 mg of $H_3PO_3$ and 100 mg of $Sb_2O_3$ and 0.04% of $TiO_2$ have been stirred in, the temperature is raised over an hour to 280° and the pressure reduced to 0.1–0.5 mbar. The polycondensation, which proceeds with the elimination of glycol, is completed under these conditions in the course of about two hours.

The product obtained is a light-colored polymer which has a $T_g$ of 68°, a $T_k$ of 195° and a $T_s$ of 244°, a phosphorus content of 0.6% and a relative viscosity of 1.70. The product is dried at 150° and 15 mbar for 8 hours and spun at 280° with a takeoff speed of 1000 m/min. The filaments drawn in a conventional manner to a draw ratio of 1:3.62 have the following properties:

Tenacity: 20 cN/tex
Breaking extension: 18.5%
Tenacity after hydrolysis: 18 cN/tex
Relative viscosity after hydrolysis: 1.49
Bending test cycles: 610
Burning test: M1

Comparative Example 1

Example 1 is repeated without TES. The polycondensation is carried out under identical conditions, i.e. to the same melt viscosity. The resulting polymer has a $T_g$ of 77°, a $T_k$ of 193°, a $T_s$ of 247°, a phosphorus content of 0.6% and a relative viscosity of 1.75. The fibers obtained therefrom have the following properties:

Tenacity: 29 cN/tex
Breaking extension: 24.5
Tenacity after hydrolysis: 28 cN/tex
Relative viscosity after hydrolysis: 1.69
Bending test cycles: 2550
Burning test: M1

EXAMPLE 2

In a stirred vessel equipped with a column and a reflux condenser, 1000 g of DMT and 600 ml of glycol are heated with 330 mg of manganese acetate and 2.5 g (0.25%) of TES at 150°–220° for about 3 hours until the elimination of methanol has ended. Thereafter 59 g (5.9%) of diisopropylphosphinylmethylsuccinic acid are esterified in at 220°–230° over about 30 minutes until water elimination is complete. After 120 mg of $H_3PO_3$ and 100 mg of $Sb_2O_3$ and 0.04% of $TiO_2$ have been stirred in, the temperature is raised over an hour to 280° and the pressure reduced to 0.1–0.5 mbar. The polycondensation, which proceds with the elimination of glycol, is completed under these conditions in the course of about 2 hours.

The product obtained is a light-colored polymer which has a P content of 0 6%, a $T_g$ of 72°, a $T_k$ of 188° and a $T_s$ of 244° and a relative viscosity of 1.75.

The product is dried at 150° and 15 =bar for 8 hours and spun at 280° with a takeoff speed of 1000 m/min. The filaments drawn in a conventional manner at a draw ratio of 1:3.62 have the following properties:

Tenacity: 22 cN/tex
Breaking extension: 16.8%
Tenacity after hydrolysis: 20 cN/tex
Relative viscosity after hydrolysis: 1.52
Bending test cycles: 750
Burning test: M1

EXAMPLE 3

In a stirred vessel equipped with a column and a reflux condenser, 2000 g of DMT and 1200 ml of glycol are heated with 660 mg of manganese acetate and 5 g (0.25%) of tetraethyl orthosilicate (TES) at 160°–210° for about 2 hours until the elimination of methanol has ended. Thereafter 155 g (7.75%) of (6H-dibenz[c,e]- [1,2]oxaphosphorineoxide)-6-yl-methylsuccinic acid are esterified in at 220°–230° over 30 minutes until water elimination is also complete. After 240 mg of $H_3PO_3$, 200 mg of $Sb_2O_3$ and 0.04% of $TiO_2$ have been stirred in, the temperature is raised to 280° and the pressure reduced to 0.1–0.5 bar over 1.5 hours. The polycondensation, which proceds with the elimination of glycol, is then completed under these conditions in the course of about four hours.

The product obtained is a light-colored polymer which has a $T_g$ of 80°, a $T_k$ of 156° and a $T_s$ of 249°, a P content of 0.5% and a relative viscosity of 1.78.

The product is dried at 150° and 15 mbar for 8 hours and spun at 280° with a takeoff speed of 1000 m/min. The filaments drawn in a conventional manner at a draw ratio of 1:3.62 have the following properties:

Tenacity: 22 cN/tex
Breaking extension: 23%
Tenacity after hydrolysis: 20 cN/tex
Relative viscosity after hydrolysis: 1.52
Bending test cycles: 430
Burning test: M1

Comparative Example 2

Example 3 is repeated without TES. The polycondensation is carried out under identical conditions, i.e. to the same melt viscosity. The resulting polymer has a $T_g$ of 82°, a $T_k$ of 178°, a $T_s$ of 242°, a phosphorus content of 0.6% and a relative viscosity of 1.81. The fibers spun therefrom have the following properties:

Tenacity: 32 cN/tex
Breaking extension: 26.2%
Tenacity after hydrolysis: 32 cN/tex
Relative viscosity after hydrolysis: 1.75
Number of bending test cycles: 2750
Burning test: M1

Comparing the polyester fiber of the invention with the polyester fibers of the comparative examples shows that, on hydrolysis, the addition of TES results in a decrease in the breaking strength by about 10% and in the relative viscosities by more than 0.2, whereas, without TES, the breaking strengths remain virtually unaffected and the relative viscosities decrease by less than 0.1. The bending test cycles clearly show the effect of the TES modifier on the pilling characteristics. Whereas the fibers of the comparative examples gave values of 2500– 2700—values as also found in the case of normal polyester fibers—the bending test cycles of the fibers modified according to the invention are within the range from 430 to 750, i.e. within a range typical of low-pill fibers.

What is claimed is:

1. A low-pill, low-flammability linear fiber-forming polyester, comprising a linear polyester formed from dicarboxylic acid and diol components, said polyester containing in its polymer chain modifying units formed by esterification or transesterification from compounds of the formula I

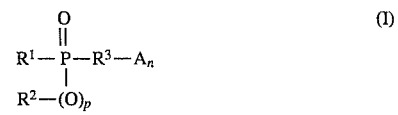

and compounds of the formula II, formula III, or mixtures of compounds of the formulae II and III

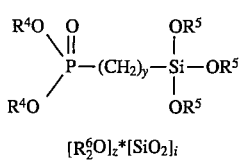

$$[R^6_2O]_z*[SiO_2]_i \quad \text{(III)}$$

where
- $R^1$ and $R^2$ are identical or different and each is a univalent aliphatic, araliphatic or aromatic hydrocarbon radical having 1 to 12 carbon atoms, or
- $R^1$ and $R^2$ are together a bivalent aliphatic, araliphatic or aromatic radical,
- $R^3$ is an (n+1)-valent organic radical,
- A is a group capable of ester formation, n is an integer from 1 to 3, and p is 0 or 1,
- $R^4$ and $R^5$ are identical or different and each is hydrogen or a univalent aliphatic, araliphatic or aromatic hydrocarbon radical having 1 to 12 carbon atoms,
- y is an integer from 1 to 10,
- $R^6$ is hydrogen or a univalent aliphatic, araliphatic or aromatic hydrocarbon radical having 1 to 12 carbon atoms, and the index z is 0 or an integer from 1 to 2*i and the index i is 1 to 20.

2. The polyester as claimed in claim 1, wherein the phosphorous compounds of formula I are provided in an amount such that the polyester has a phosphorous content of from about 0.1 to 2.5 percent by weight.

3. The polyester as claimed in claim 1, wherein the silicon compounds of the formula II, formula III, or mixtures of silicon compounds of the formulae II and III are provided in an amount such that the polyester has an Si content of from 0.01 to 0.5 percent by weight.

4. The polyester as claimed in claim 1 wherein the polyester chain contains a major proportion of units derived from aromatic dicarboxylic acids and aliphatic diols, and up to 20 mol % of dicarboxylic acid units and glycol units.

5. The polyester as claimed in claim 1 wherein the polyester polymer chains contain from 0 to 100 mol % of groups of the formula IV

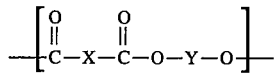

and from 100 to 0 mol % of groups of the formula V

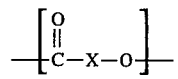

where
- X contains more than 80 mol % of aromatic radicals having 5 to 16 carbon atoms and not more than 20 mol % of aliphatic radicals having 4 to 10 carbon atoms,
- Y contains at least 80 mol % of alkylene or polymethylene groups having 2 to 4 carbon atoms or cycloalkane or dimethylcycloalkane groups having 6 to 10 carbon atoms and not more than 20 mol % of straight-chain or branched alkanediyl having 4 to 16 carbon atoms, or
- radicals of the formula $-(C_2H_4-O)_m-C_2H_4-$, where m is an integer from 1 to 40, or
- a radical of the formula $-(CH_2)_q-Q-(CH_2)_q-$, where
- Q is O or S (an oxygen or sulfur atom), where q is an integer from 2 to 8, or
- Q is cycloalkanediyl, or a monocyclic or bicyclic fused or non-fused aromatic radical where q is an integer from 0 to 8.

6. The polyester as claimed in claim 1 wherein the dicarboxylic acid units consist essentially of units of terephthalic acid and the diol units consist essentially of units of ethylene glycol.

7. The polyester as claimed in claim 5, wherein X contains more than 80 mol % of aromatic radicals having 6 to 12 carbon atoms and up to 20 mol % of aliphatic radicals having 6 to 8 carbon atoms.

8. The polyester as claimed in claim 5, wherein Y contains at least 80 mol % of alkylene of polymethylene group having 2 to 4 carbon atoms or cycloalkane or dimethylcycloalkane groups having 6 to 10 carbon atoms and up to 20 mol % of straight-chain or branched alkanediyl having 4 to 8 carbon atoms.

9. The polyester as claimed in claim 5, wherein when Y contains less than 5 mol % of straight-chain or branched alkanediyl having 4 to 16 carbon atoms, M=10 to 40.

10. The polyester as claimed in claim 5, wherein when Y contains more than 5 mol % of straight-chain or branched alkanediyl having 4 to 16 carbon atoms, M=10 to 40.

11. The polyester as claimed in claim 5, wherein Q is phenylene or a radical of the formula VI.

12. A process for the preparation of linear polyester as claimed in claim 18 comprising the step of:

reacting at least one dicarboxylic acid or hydroxycarboxylic acid of the formula IVa or of the formula Va HOOC—X—COOH (IVa)

HOOC—X—OH (Va)

where X is as defined above, or lower alkyl esters of those compounds, with diols of the formula IVb HO—Y—OH (IVb)

where y is as defined above, in the presence of compounds of the formula I and II, or I, II, and III, by transesterification or esterification, and polycondensing the reaction product.

13. The process as claimed in claim 12, wherein the phosphorous compounds are used as free dicarboxylic acids.

14. The process as claimed in claim 12, wherein silicone compounds of the formulae II or III are added in the esterification process.

15. A shaped article produced from the linear polyester as claimed in claim 1 by compression, extrusion molding, or injection molding.

16. A fiber material produced by extruding the linear polyester as claimed in claim 1.

17. A textile material produced from the fiber material as claimed in claim 16.

* * * * *